(12) United States Patent
Verhaeghe et al.

(10) Patent No.: US 10,165,730 B2
(45) Date of Patent: Jan. 1, 2019

(54) METHOD OF OPERATING AN AGRICULTURAL BALER

(71) Applicant: CNH Industrial America LLC, New Holland, PA (US)

(72) Inventors: Didier Verhaeghe, Ypres (BE); Tom Coen, Zemst (BE); Kenny Nona, Kessel-Lo (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/907,725

(22) PCT Filed: Jul. 17, 2014

(86) PCT No.: PCT/EP2014/065355
§ 371 (c)(1),
(2) Date: Jan. 26, 2016

(87) PCT Pub. No.: WO2015/014625
PCT Pub. Date: Feb. 5, 2015

(65) Prior Publication Data
US 2016/0165802 A1  Jun. 16, 2016

Related U.S. Application Data

(60) Provisional application No. 61/860,531, filed on Jul. 31, 2013.

(30) Foreign Application Priority Data

Oct. 21, 2013 (BE) .................................. 2013/0708

(51) Int. Cl.
*A01F 15/08* (2006.01)
*G01L 5/00* (2006.01)
(Continued)

(52) U.S. Cl.
CPC .......... *A01F 15/0825* (2013.01); *A01F 15/00* (2013.01); *A01F 15/042* (2013.01);
(Continued)

(58) Field of Classification Search
CPC . B30B 9/3007; B30B 9/3025; A01F 15/0825; A01F 15/00; A01F 15/042; G01L 5/0038
(Continued)

(56) References Cited

U.S. PATENT DOCUMENTS 4,624,180 A   11/1986  Strosser
8,794,135 B1 *  8/2014  Simon .................. B30B 9/3057
                                                             100/269.01
(Continued)

FOREIGN PATENT DOCUMENTS

BE    1020897 A3   8/2014
FR    2754138 A1   4/1998

OTHER PUBLICATIONS

Faborode M O ; O'Callaghan Jr—Theoretical analysis of the compression of fibrous agricultural materials, Journal of Agricultural Engineering Research, 19861101 Academic Press—ISSN 0021-8634, vol. 35, Nr:3, pp. 175-191.

(Continued)

*Primary Examiner* — Atul Trivedi
(74) *Attorney, Agent, or Firm* — Patrick M. Sheldrake

(57) ABSTRACT

A method and system for operating an agricultural baler, that includes measuring at least one physical input parameter associated with a compression profile of crop material in a bale chamber of the baler; analyzing the compression profile of the crop material, dependent upon the measured at least one physical input parameter; and adjusting at least one physical output parameter of the baler which affects the compression profile of the crop material in the bale chamber.

15 Claims, 12 Drawing Sheets

(51) Int. Cl.
*B30B 9/30* (2006.01)
*A01F 15/04* (2006.01)
*A01F 15/00* (2006.01)

(52) U.S. Cl.
CPC .......... *B30B 9/3007* (2013.01); *B30B 9/3025* (2013.01); *G01L 5/0038* (2013.01)

(58) Field of Classification Search
USPC .......................................................... 701/50
See application file for complete search history.

(56) References Cited

U.S. PATENT DOCUMENTS

| | | | | |
|---|---|---|---|---|
| 9,642,311 | B2* | 5/2017 | Posselius | A01F 15/10 |
| 2008/0141870 | A1* | 6/2008 | Verhaeghe | A01F 15/0875 |
| | | | | 100/7 |
| 2011/0023732 | A1* | 2/2011 | Herron | A01D 43/06 |
| | | | | 100/40 |
| 2012/0067229 | A1* | 3/2012 | Lanning | B30B 9/301 |
| | | | | 100/8 |
| 2012/0179338 | A1* | 7/2012 | Dresher | A01F 15/101 |
| | | | | 701/50 |
| 2012/0186467 | A1* | 7/2012 | Lanning | B30B 9/30 |
| | | | | 100/50 |
| 2012/0192732 | A1* | 8/2012 | Lanning | B30B 9/301 |
| | | | | 100/245 |
| 2012/0326417 | A1* | 12/2012 | Lanning | A01F 15/0825 |
| | | | | 280/423.1 |
| 2013/0000496 | A1* | 1/2013 | Posselius | A01F 15/0825 |
| | | | | 100/40 |
| 2013/0000497 | A1* | 1/2013 | Posselius | A01F 15/10 |
| | | | | 100/40 |
| 2014/0202343 | A1 | 7/2014 | van Amstel et al. | |
| 2017/0013772 | A1* | 1/2017 | Kirk | A01F 15/071 |
| 2017/0013782 | A1* | 1/2017 | Kindt | A01F 15/042 |

OTHER PUBLICATIONS

Peleg M; Peleg M; Normand M D—Comparison of two methods for stress relaxation data presentation of solid foods, Rheologica Acta, 19830101 Springer Berlin Heidelberg—ISSN 0035-4511, vol. 22, Nr:1, pp. 108-113.

* cited by examiner

METHOD OF OPERATING AN AGRICULTURAL BALER

This application is the US National Stage filing of International Application Serial No. PCT/EP2014/065355 filed on Jul. 17, 2014 which claims priority to U.S. Provisional Application 61/860,531 filed Jul. 31, 2013, and Belgium Application BE2013/0708 filed Oct. 21, 2013, each of which is incorporated herein by reference in its entirety.

FIELD OF THE INVENTION

The present invention relates to agricultural balers, and, more particularly, to methods of operating agricultural balers.

DESCRIPTION OF THE RELATED ART

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber which is then transferred to a main bale chamber. (for purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit which chops the crop material into smaller pieces.

A stuffer unit transfers the wad of crop material in charges from the pre-compression chamber to the main bale chamber. Typically such a stuffer unit includes stuffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

Compressing crop residue materials using a large square baler, as described above, makes them easier to handle and reduces labor and transport costs. Since a high density for the material is needed at high capacities, extrusion is preferred over a fixed wall compression. However, due to frictional heating of the main bale chamber this process requires more power resulting in a higher fuel consumption. The power consumption is thus related to the frictional resistance in the bale chamber. Lowering this friction will lower the power consumption but can also cause the final compressed density to decrease. If the final compression density is too high, then excess power was used to generate the bale. There is thus a trade-off between power consumption and bale density during the compression process within the bale chamber Compression modeling algorithms are known which describe the compression profile of the crop material. However, such compression modeling algorithms are only used on lab type experiments with simulated bale chambers, or they use oversimplified descriptions of the material behavior. The simulated bale chambers may be much smaller than an actual bale chamber, and the crop material is typically cut into small pieces. Such compression modeling algorithms are useful to at least get an idea as to what is actually happening to the crop material within a bale chamber, but lack accuracy in describing what is really happening to the crop material on a dynamic basis within a bale chamber of a baler during operation.

What is needed in the art is a compression modeling method which can be used on-the-fly during baling, such that the baler operation can be optimized.

SUMMARY OF THE INVENTION

The present invention provides a method of operating a baler in which input parameters related to the compression profile of crop material in the bale chamber are used in a compression modeling algorithm to adjust physical actuators, on the output side, to thereby optimize operation of the baler.

The invention in one form is directed to a method of operating an agricultural baler, including the steps of: measuring at least one physical input parameter associated with a compression profile of crop material in a bale chamber of the baler; analyzing the compression profile of the crop material, dependent upon the measured at least one physical input parameter; and adjusting at least one physical output parameter of the baler which affects the compression profile of the crop material in the bale chamber.

The invention in yet another form is directed to an agricultural baler, including at least one sensor for measuring one or more physical input parameters associated with a compression profile of crop material in a bale chamber of the baler. Each sensor provides an output signal corresponding to a sensed physical input parameter. An electrical processing circuit is coupled with each sensor and is configured for analyzing the compression profile of the crop material, dependent upon the measured one or more physical input parameters. At least one actuator, under control of the electrical processing circuit, is configured for adjusting one or more physical output parameters of the baler which affect the compression profile of the crop material in the bale chamber.

An advantage of the present invention is that the compression profile of the crop material within the baler can be measured "on-the-fly", and adjusted to optimize the operation of the baler.

Another advantage is that the compression profile can be measured using a non-linear analysis, which is a more accurate way of determining the compression profile of the crop material.

Yet another advantage is that the measured input parameters relating to the compression profile can be either directly or indirectly related to physical attributes associated with the main bale chamber.

A further advantage is that input parameters such as temperature of the crop material and friction against the crop material can be accounted for with the analysis techniques.

A still further advantage is that the relaxation of the crop material between strokes of the plunger can be lessened through the use of holding structures, such as clamping side walls and/or hay dogs.

Another advantage is that it is possible to determine on an incremental basis which part of the compressed crop material actually undergoes compression with each new stroke of the plunger.

Yet another advantage is that multiple output parameters can be adjusted to affect the compression profile of the crop material, such as the position of the side walls, length of the bale chamber and/or cross sectional shape of the bale chamber.

A further advantage is that the measuring, analysis and adjustment occurs in a closed loop manner, allowing continual optimization of the baler.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
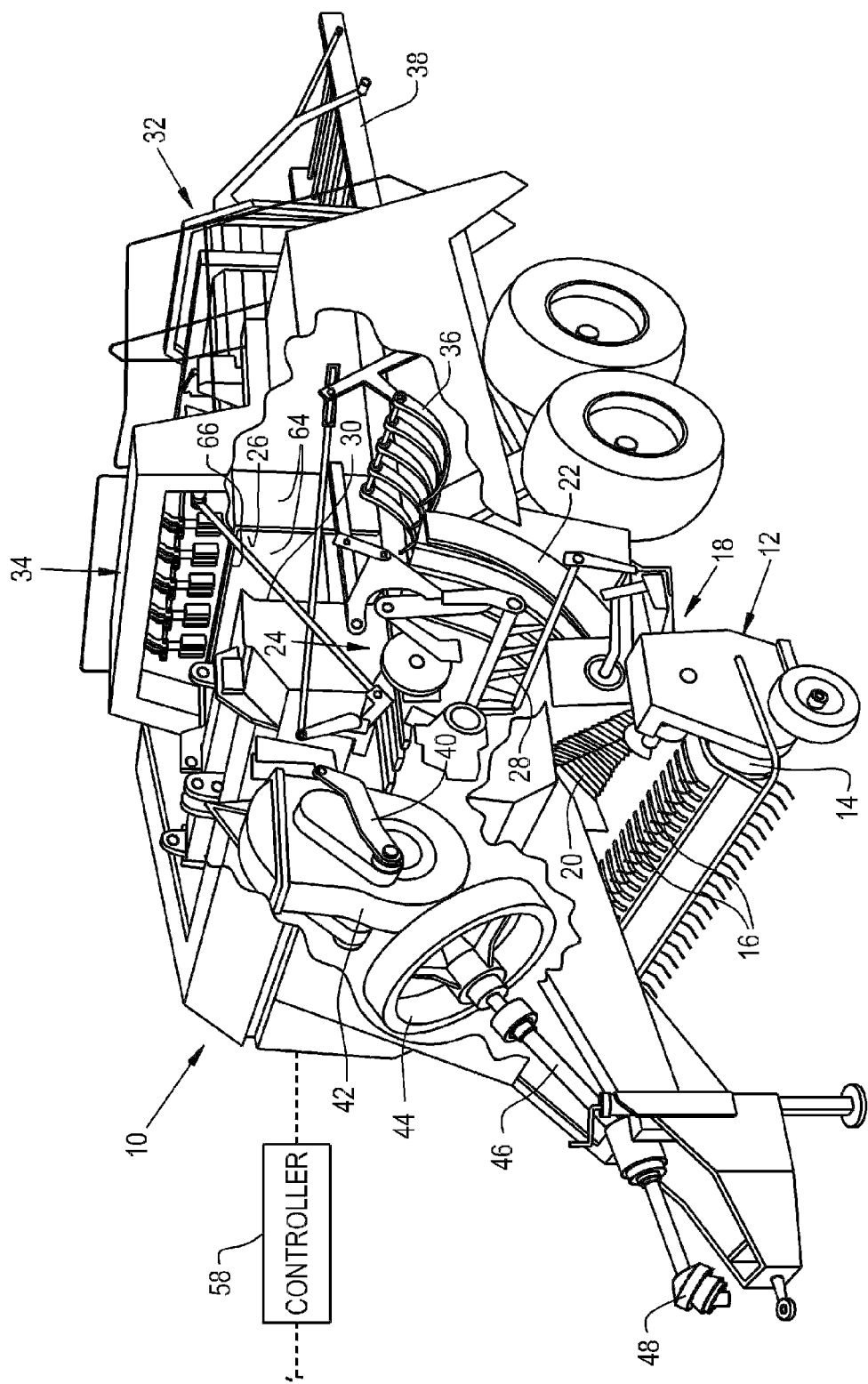
FIG. 1 is a perspective cutaway view showing the internal workings of a large square baler which may be used with the method of operation of the present invention.
Figure 2:
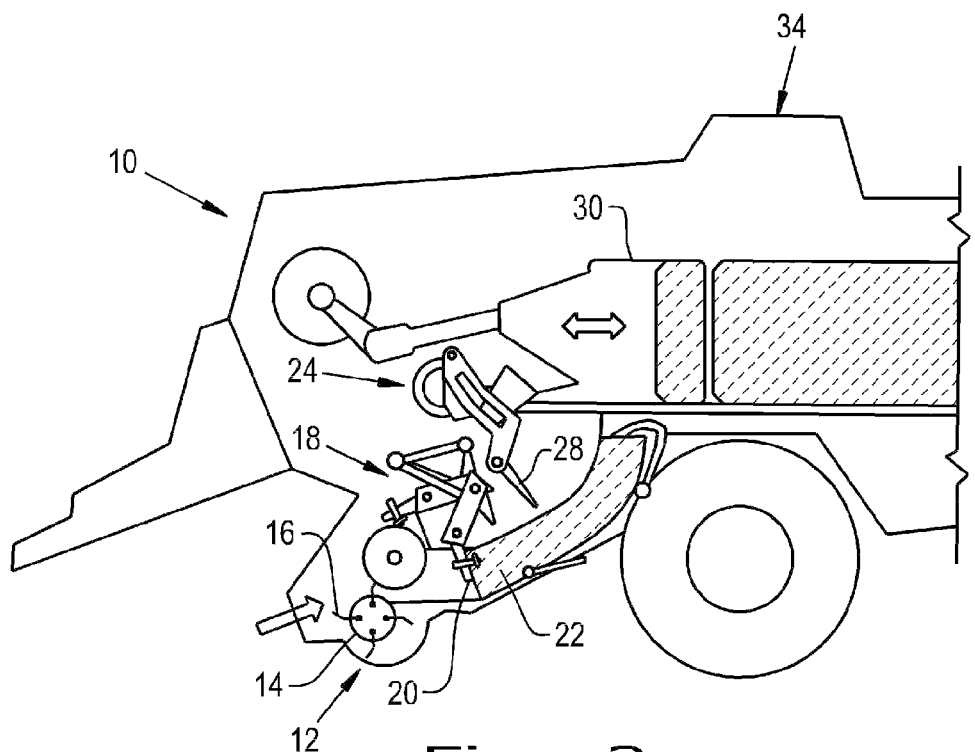
FIGS. 2 and 3 are schematic illustrations showing the formation of a bale within the large square baler of FIG. 1.
Figure 3:
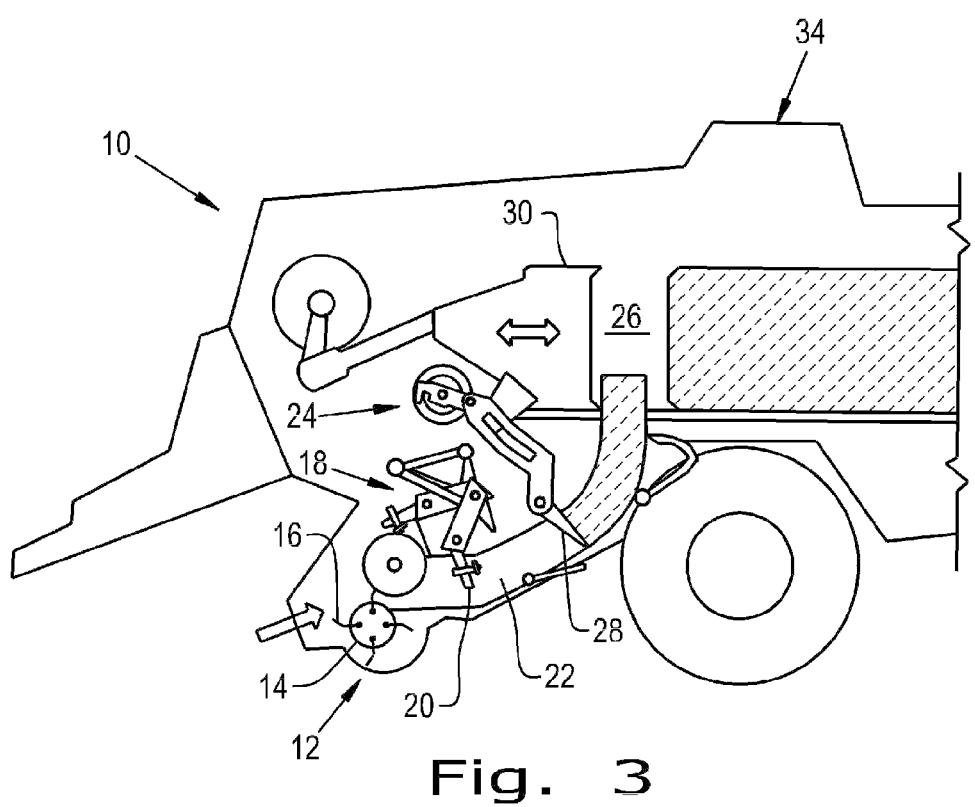

Referring now to the drawings, and more particularly to FIGS. 1-3, there is shown an agricultural harvesting machine in the form of a large square baler 10. FIG. 1 is a perspective cutaway view showing the internal workings of a large square baler 10, and FIGS. 2 and 3 are schematic illustrations showing the formation of a bale within baler 10.

Baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. Pre-compression chamber 22 and packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. Stuffer forks 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. Main bale chamber 26 and plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

Plunger 30 is connected via a crank arm 40 with a gear box 42. Gear box 42 is driven by a flywheel 44, which in turn is connected via a drive shaft 46 with the PTO coupler 48. The PTO coupler is detachably connected with the PTO spline at the rear of the traction unit, such as a tractor (not shown).

According to an aspect of the present invention, baler 10 is operated in a closed-loop manner to optimize the compression profile of the crop material within the main bale chamber 26. In general, input parameters associated with the compression profile of the crop material in the main bale chamber 26 are sensed and used in a mathematical analysis method to determine the compression profile of the crop material for each compression stroke of the plunger 30. One or more crop models are used in the mathematical analysis method, utilizing the sensor input parameters, to determine the compression profile of the crop material. The compression profile of the crop material is then used to determine if one or more output parameters of the baler 10 should be adjusted to optimize the compression profile. This sensing, analysis and adjustment occurs in a closed-loop manner to optimize the operation of the baler 10. The mathematical analysis method is used for optimization of the baler 10 with respect to energy consumption of the baler and the compression profile of the crop material.

Figure 4:
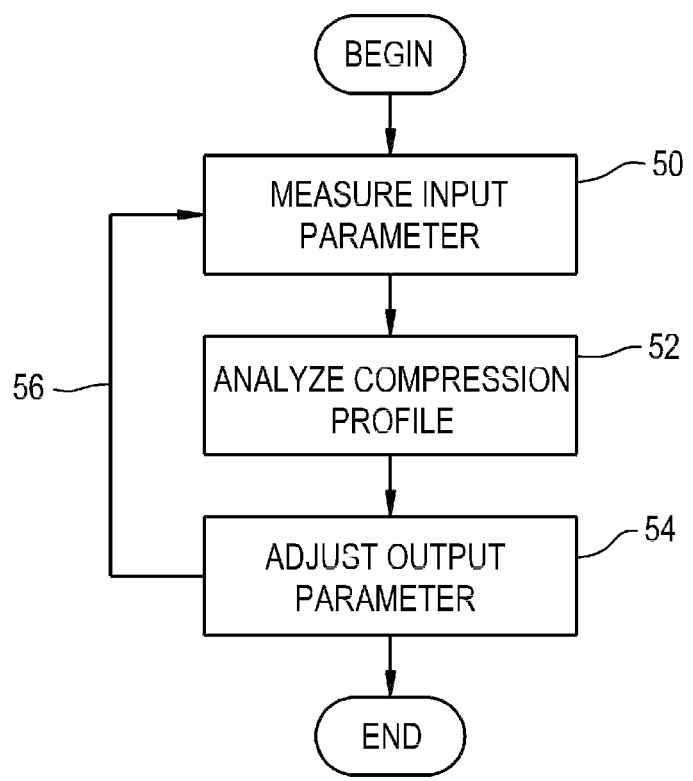
FIG. 4 is a flowchart illustrating an embodiment of the method of operation of the present invention.

More particularly, and referring to FIG. 4, one or more sensors are used for measuring at least one physical input parameter associated with a compression profile of crop material in a bale chamber of the baler. Each sensor provides an output signal corresponding to a sensed physical input parameter. The sensor(s) need not necessarily be located in the main bale chamber, but are used to sense properties that relate to the compression profile of the crop material that is within the main bale chamber (box 50). An electrical processing circuit is coupled with each sensor and is configured for analyzing the compression profile of the crop material, dependent upon the measured at least one physical input parameter (box 52). The electrical processing circuit can be, e.g., a suitable controller 58 (FIG. 1, shown schematically with dashed lines indicating that the controller can be part of the baler 10 or the traction unit (not shown)), and is coupled with one or more actuators. Each actuator is configured for adjusting at least one physical output parameter of the baler 10 which affects the compression profile of the crop material in the bale chamber 26 (box 54). This analysis process is carried out in a closed-loop manner while the baler 10 is operating (return line 56).

The sensor(s) used to measure the physical input parameters may measure, for example, but not limiting:

a force on the plunger 30 which reciprocates within the bale chamber 26;

a position of the plunger 30 within the main bale chamber 26;

a position of at least one structural component defining the bale chamber 26; or a deformation of the crop material along a length of the bale chamber 26.

The force on the plunger 30 can be measured using a strain gauge (not shown). As another alternative, the speed of the crank arm can be used to determine the force on the plunger. This type of plunger force measuring system is further described in a copending patent application BE2013/0327 entitled "A method and system for determining the plunger load of a baler", which is incorporated herein by reference.

Figure 5:
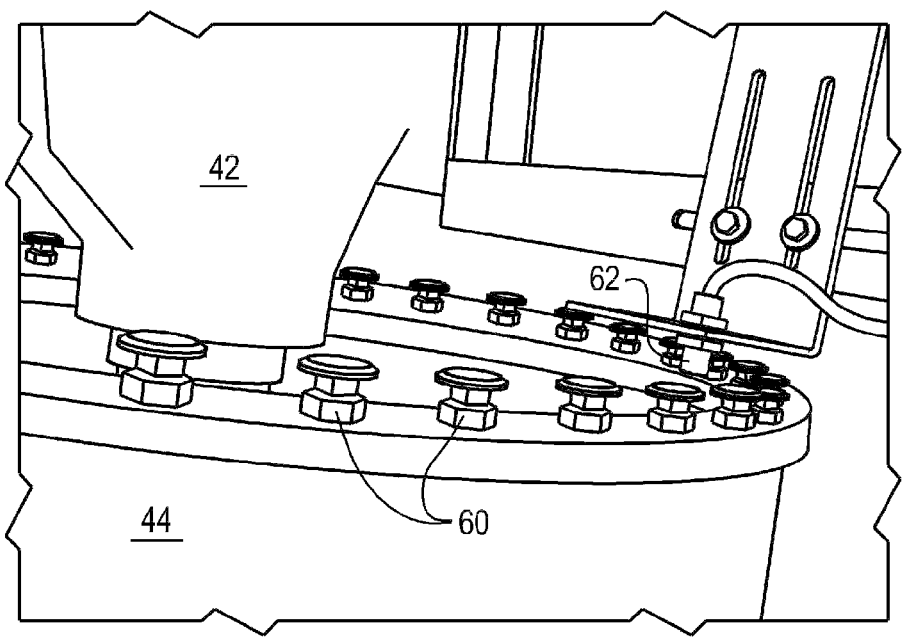
FIG. 5 is a fragmentary perspective view showing a portion of the gearbox and flywheel in the baler of FIG. 1.

The position of the plunger may be determined by measuring a rotation of a flywheel 44 which is connected with the plunger 30 via the crank arm 40, and a dead point associated with a change in direction of the plunger 30 (FIG. 5). The flywheel 44 may include structural features such as pins or bolts 60 spaced at predetermined intervals around the periphery thereof which are sensed by a sensor, such as an inductive sensor 62, for determining the position of the flywheel 44. Other types of sensors may also be used to measure the rotation of the flywheel 44, such as optical sensors, proximity sensors, encoders, etc. The position of the flywheel 44 can in turn be used to determine the position of the plunger 30 within the main bale chamber 26. The force on the plunger 30 and the position of the plunger 30 may also be correlated to each other.

Figure 6:
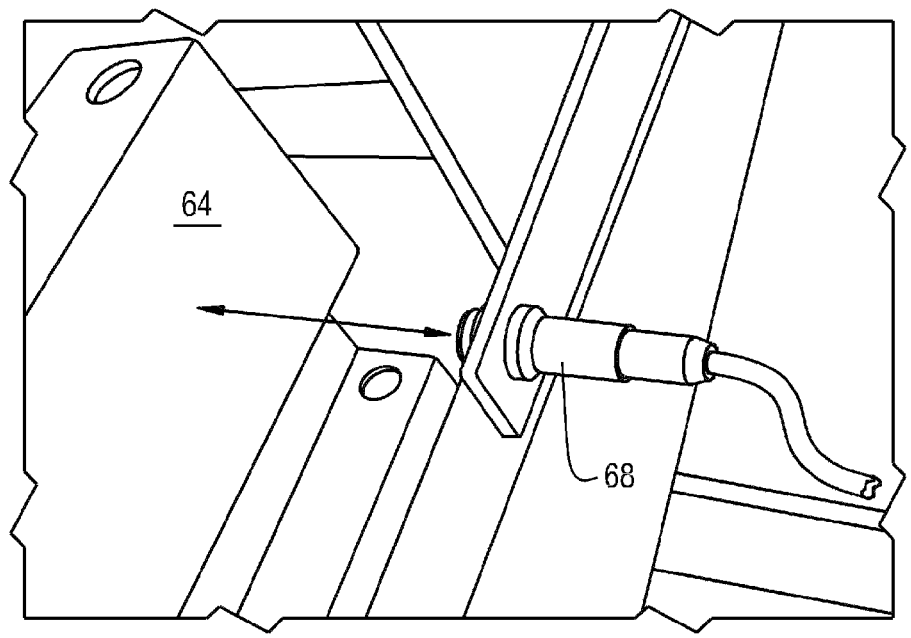
FIG. 6 is a fragmentary perspective view showing a portion of the left side door or sidewall in the baler of FIG. 1.

The one or more structural components of the bale chamber which may be measured include a pair of side doors 64 and a top door 66 (FIGS. 1 and 6). The side doors 64 and top door 66 may be straight or may include a bend (i.e., angled surface), as will be described in more detail below. The position of the side doors 64 may be measured using a sensor, such as an inductive sensor 68, which determines the distance between the sensor 68 and the side door 64. Other types of sensors may also be used to measure the position of the side doors 64 and top door 66.

Figure 7:
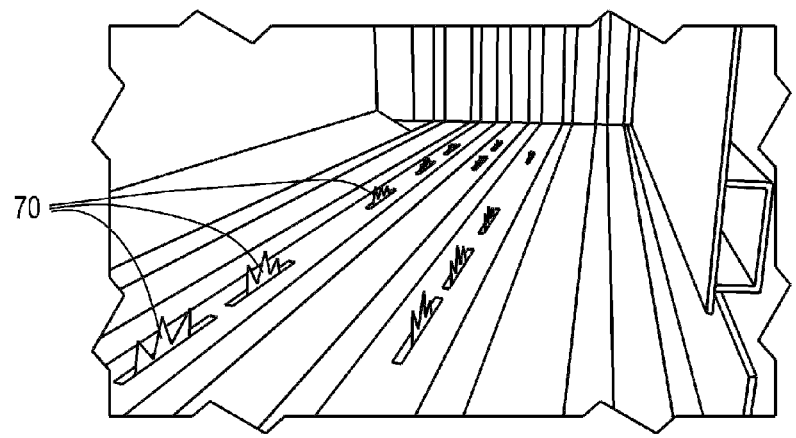
FIG. 7 is a fragmentary perspective view showing the length wheels used in the floor of the baler of FIG. 1.

The deformation of the crop material along the length of the bale chamber 26 may be measured using one or more length wheels 70 located within the bale chamber 26 (FIG. 7). Each length wheel 70 is located in a floor of the bale chamber 26, and has a generally star shaped configuration with points that extend into the compressed crop material. As the plunger pushes the crop material past the length wheel 70, the length wheel in the beginning of the baling chamber rotates which indicates that compression is occurring in that portion of the bale chamber 26. For portions of the bale that have been compressed in previous compression strokes and remain compressed between strokes, then the length wheels in that part of the bale chamber do not rotate as the plunger compresses the crop material. If the last wheel (closest to the plunger end of the bale chamber 26) starts to rotate, indicating completion of the bale, then the compression is at its end and the plunger 30 will begin to move the bale.

The one or more actuators under the control of controller 58 affect the physical output parameters having an influence on the compression profile of the crop material within the bale chamber 26. These physical output parameters are preferably directly associated with the bale chamber 26, and may include:

a position of one or more side walls associated with the bale chamber;

a fixed length of the bale chamber; and a cross-sectional shape of the bale chamber.

Figure 8:
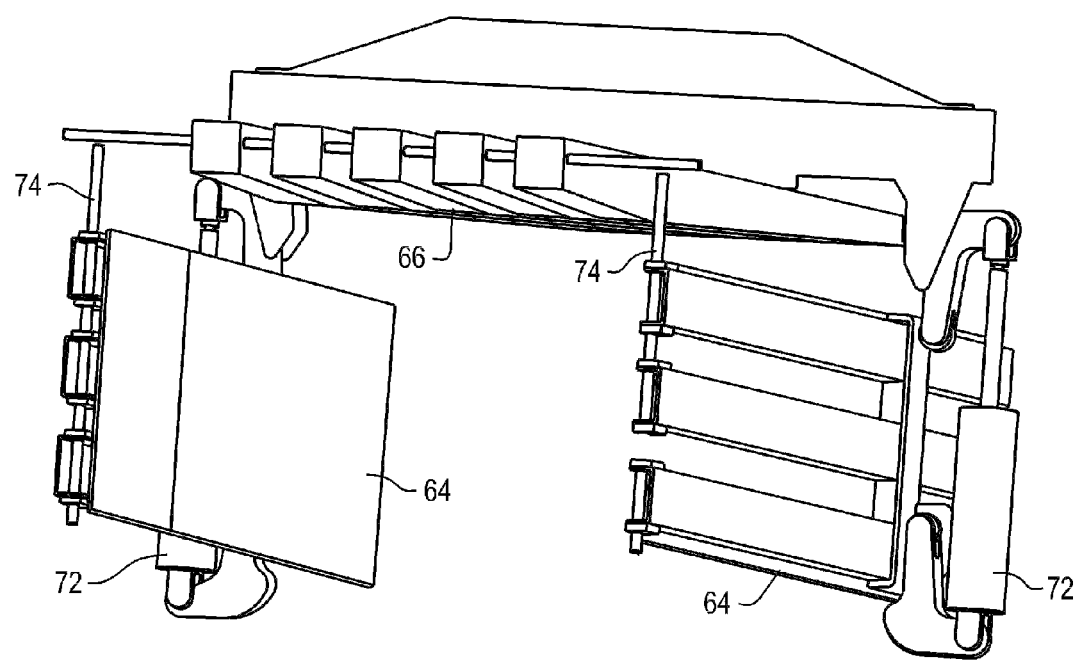
FIG. 8 is a perspective view showing the side doors and top door in the baler of FIG. 1.

Referring to FIG. 8, the position of the side doors 64 may be adjusted using hydraulic actuators 72. Each side door 64 pivots around a front pivot rod 74, such that the angle of the side door about pivot rod 74 changes as the side doors 64 are pushed toward and away from actuators 72. The side doors and/or top door may also be configured with a variable geometry allowing the cross-sectional shape of the bale chamber 26 to be adjusted using suitable actuators.

Compression Analysis Example

Current compression profile analyses do not allow a proper simulation of the material behavior in the main bale chamber of a large square baler. To correct for these analysis shortfalls, it is necessary to:

1. use non-linear crop model with interpretable parameters, for a proper description of the material;

2. take the bend in the one or more doors into account for proper simulation of the compression behavior; and 3. calculate the deformation profile along the chamber length which characterizes the pulsation zone and the clamping of the material.

The decay of the compression force along a compression box with constant cross section has been calculated in literature. In deriving the force balances, the friction force is assumed to be the same for all doors. However, it is known that the friction forces will be different at different doors in the baling chamber. As a result, this model for the stress-decay in the compression chamber is not applicable to a compression chamber for extrusion. Also the resulting deformation along the length of the compression box is not calculated when using this equation. After considering the inclination of 3 walls, being the top wall and the two side walls, equations 1-3 are derived for the forces in respectively the x, y and z directions. These equations consider the effect of the inclined side walls on the friction force. Then, a crop model (linear or non-linear) was used in calculating the stress decay with the depth in the compression box as a function of the plunger position and the inclination of the side walls. It is then possible to predict the pressure and the deformations when the crop parameters and the plunger position are known.

The stresses in the compression chamber are modelled as described above. To relate the stresses with the resulting deformations, a crop model is necessary. First the material is described with the 3D, linear elastic material model. Then, a non-linear material model is extended to 3 dimensions for using it in the material description. This last relation is further called the Faborode model, described below.

The Pressure and the Deformation Along the Depth of the Chamber

Material compression in the large square baler is divided into different phases. In the first phase, the newly added material and the expanded material from previous cycles, is compressed against the clamped material in the chamber. In the next phase, the bale starts to move.

Figure 9:
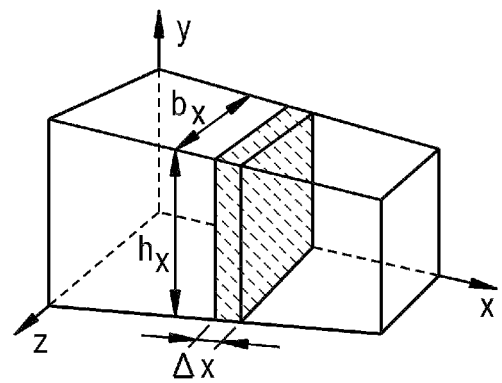
FIG. 9 is a schematic illustration showing discretization of the crop material in the bale chamber of the baler of FIG. 1.

This study focuses on the compression of the crop while assuming a stationary condition, i.e., before the bale starts moving. Because the compression continues from the front till the back of the chamber, the material is discretized in slices, as shown in FIG. 9. The forces acting on the slice are shown in FIG. 10 for the xy-plane and FIG. 11 for the xz-plane.

Figure 10:
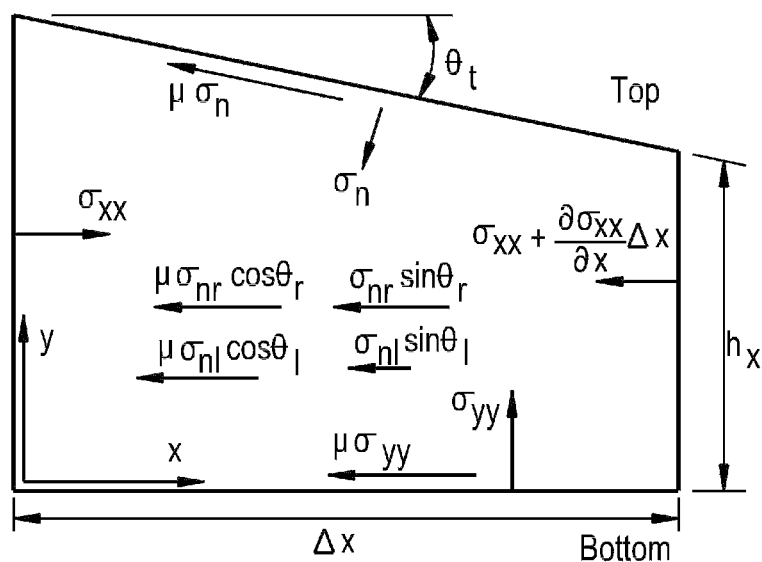
FIG. 10 illustrates the stresses acting on an elementary volume, in the XY plane shown in FIG. 9.
Figure 11:
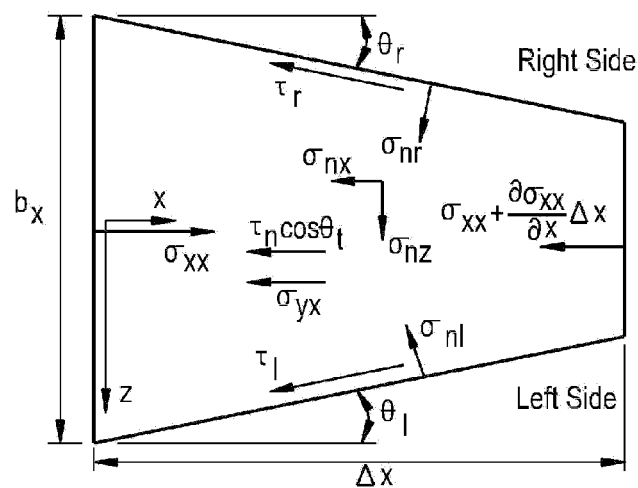
FIG. 11 illustrates the stresses acting on an elementary volume, in the XZ plane shown in FIG. 9.

The friction forces in FIGS. 10 and 11 are replaced by their respective normal forces by using Coulombs law of friction, with friction coefficient $\mu$. For small inclinations of the side walls and of the top door ($\theta_l = \theta_r$ and $\sin \theta_l = \theta_l$, $\cos \theta_l = 1$), the following balances in x, y and z are derived:

$$-\frac{\delta \sigma_{xx}}{\delta x} h_x b_x - \mu \sigma_{yy} b_x - \quad (1)$$
$$\sigma_n(\mu + \theta_t) b_x - \sigma_{nl}(\theta_l + \mu) h_x - \sigma_{nr}(\theta_l + \mu) h_x = 0$$

$$\sigma_{yy} - \sigma_n(1 - \mu \theta_t) = 0 \quad (2)$$

$$(\sigma_{nl} - \sigma_{nr})(\mu \theta_t - 1) h_x = 0 \quad (3)$$

The balances in y and z (Equations 2-3) are filled into the balance in x (Equation 1) to give the following relation in x:

$$\frac{\delta \sigma_{xx}}{\delta x} h_x b_x + \sigma_n b_x (2\mu - \mu^2 \theta_t + \theta_t) + 2\sigma_{nl}(\theta_l + \mu) h_x = 0 \quad (4)$$

Now, the stresses along the length of the compression chamber are derived and these stresses have to be linked with the deformation of the material. For comparison, two relations between stress and deformation are proposed. The first assumes linear elastic and isotropic material behavior and is given by Hooke's general law. In the second relation, the stress is assumed to rise exponentially with deformation.

Linear Elastic Material Behaviour

The balance in x, as shown in Eq. (4), gives the relation of forces on every slice in the chamber. Solving this relation with respect to the deformation, implies knowing the inclinations of the side walls ($\theta_l$, $\theta_t$) and knowing the constitutive relations. For linear elastic material behaviour, the constitutive equations are (Hooke's general law):

$$\begin{bmatrix} \sigma_{xx} \\ \sigma_{yy} \\ \sigma_{zz} \end{bmatrix} = \frac{E}{(1-2v)(1+v)} \begin{bmatrix} 1-v & v & v \\ v & 1-v & v \\ v & v & 1-v \end{bmatrix} \begin{bmatrix} \epsilon_x \\ \epsilon_y \\ \epsilon_z \end{bmatrix} \quad (5)$$

With E the Young's modulus and $v$ the Poisson coefficient. The engineering strains (or Cauchy strains) ($\epsilon_y, \epsilon_z$) are written as a function of the height and width of the chamber as:

$$\epsilon_y = \ln(h_x) - \ln(h_0)$$

$$\epsilon_z = \ln(b_x) - \ln(b_0)$$

The assumption of small inclinations of side walls and top door gives the height and width of the chamber as: $h_x = h_0 - x\theta_t$ and $b_x = b_0 - 2\theta_l$. The stress in the compression direction x (in Eq. (5)) is then written as:

$$h_x b_x (1-v) \frac{d \epsilon_x}{dx} = \quad (6)$$
$$C + (A(1-v) + Bv)\epsilon_y + (Av + B(1-v))\epsilon_z + (A+B)v\epsilon_x$$

Where $$A = b_x(2\mu - \mu^2 \theta_t + \theta_t)$$

$$B = 2(\theta_t + \mu) h_x$$

$$C = v(\theta_t b_x + 2\theta_l h_x)$$

This equation is solved by assuming the movement at the end of the fit to be 0, i.e. before the bale starts moving.

Non-Linear Material Behaviour

The Faborode crop model (Faborode, M. & O'Callaghan, J.; "Theoretical analysis of the compression of fibrous agricultural materials", Journal of Agricultural Engineering Research, Vol. 35, pp. 175-191 (1986)) relates a uniaxial stress $\sigma$ to the resulting density $\rho$ as follows:

$$\sigma_x = \frac{K_0}{b_c} \left( e^{b_c \left( \frac{\rho}{\rho_0} - 1 \right)} - 1 \right) \quad (7)$$

In this relation, bc and K0 are crop parameters identifying the material behavior and $\rho 0$ is the density before compression.

The three-dimensional non-linear constitutive relations are built up from the Faborode crop model given by equation (7). This relation is expanded into 3 dimensions by assuming the lateral forces to be a function of the compression force only (Ferrero, A.; Horabik, J. & Molenda, M., "Density-pressure relationships in compaction of straw", Canadian Agricultural Engineering, Vol. 33 (1), pp. 107-111 (1990)). This results in the following relations:

$$\sigma_n = -k_1 \sigma_x \quad (8)$$

$$\sigma_{nl} = -k_2 \sigma_x \quad (9)$$

Assuming small inclinations of the side walls allows the approximation of $h_x$ and $b_x$ by the constants $$h_m = h_o - \theta_t \frac{L}{2} \text{ and } b_m = b_o - \theta_t L$$

where L is the length of the side walls. With the force balance in x (Eq. (4)) and the non-linear constitutive relations (Eqs. (8) and (9)) the stress-decay with x is calculated as:

$$\sigma_x = \sigma_{xo} e^{\left(\frac{B}{A}\right)x} \quad (10)$$

With $A = h_x b_x$ and $B = k_1 b_x (2\mu - \mu^2 \theta_r + \theta_t) + 2k_2(\theta_r + \mu)h_x$. In this relation, the stress on the plunger $\sigma_{x0}$ is given by the Faborode model (Eq. (7)). Since the density is related to the engineering strain, the deformation can then be calculated as:

$$\epsilon_x = 1 - \left(\frac{1}{b_c} \ln\left(\left(e^{b_c\left(\frac{u_0}{u}-1\right)} - 1\right)e^{\left(\frac{E}{A}\right)x} + 1\right) + 1\right)^{-1} \quad (11)$$

With $u_0$ the initial length of the bale in the chamber and u the length during compression by the plunger.

So far, the side walls and top door are considered flat plates with an inclination. In practice, these side walls may have one or more bends, or even a curved shape, to influence the compression behavior of the compressed material. In the following section, this bend will be implemented.

Deformation by Side Walls and Top Door

Figure 12:
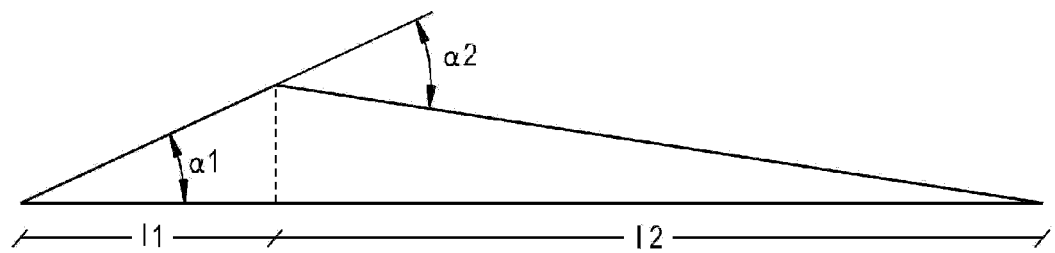
FIG. 12 is a schematic illustration of a side wall in the bale chamber of the baler of FIG. 1.

The shape of the side walls and top door determines the force and density profile in the chamber and should therefore be considered in the equations. So far, the angle in the side walls was assumed constant with x but the re-definition of the inclination will allow to re-use the derived equations. Indeed, the bend in the side walls will be defined as an extra deformation on top of the inclination of that wall. FIG. 12 is a representation of a side wall in the compression chamber of the large square baler, with the parameters $\alpha_1$, $\alpha_2$, $l_1$ and $l_2$ for describing the wall shape. The left side of FIG. 12 shows the hinge of the door.

The angles in the moment equations should then be altered into the expanded angles:

$$\theta_t^+ = \theta_t + \alpha_1 - H_{x-l_1}(x-l_1)\alpha_2 \quad (12)$$

$$\theta_l^+ = \theta_l + \alpha_1 - H_{x-l_1}(x-l_1)\alpha_2 \quad (13)$$

$$\theta_r^+ = \theta_r + \alpha_1 - H_{x-l_1}(x-l_1)\alpha_2 \quad (14)$$

And the height $h_x$ and $b_x$ are written as:

$$h_x = h_o - x(\tan \theta_t + \tan \alpha_1) + H_{x-l_1}(x-l_1)\tan \alpha_2 \quad (15)$$

$$b_x = b_o - x(\tan \theta_l + \tan \theta_r + 2 \tan \alpha_1) + 2H_{x-l_1}(x-l_1)\tan \alpha_2 \quad (16)$$

In these relations, $H_{x-l_1}$ is the Heaviside function:

$$H_{x-l_1} = \begin{cases} 0 \text{ for } x < l_1 \\ 1 \text{ for } x \geq l_1 \end{cases}$$

The necessary equations are derived above, the measurements for validating them are described in the following section.

Measurements in the Baler

Figure 13:
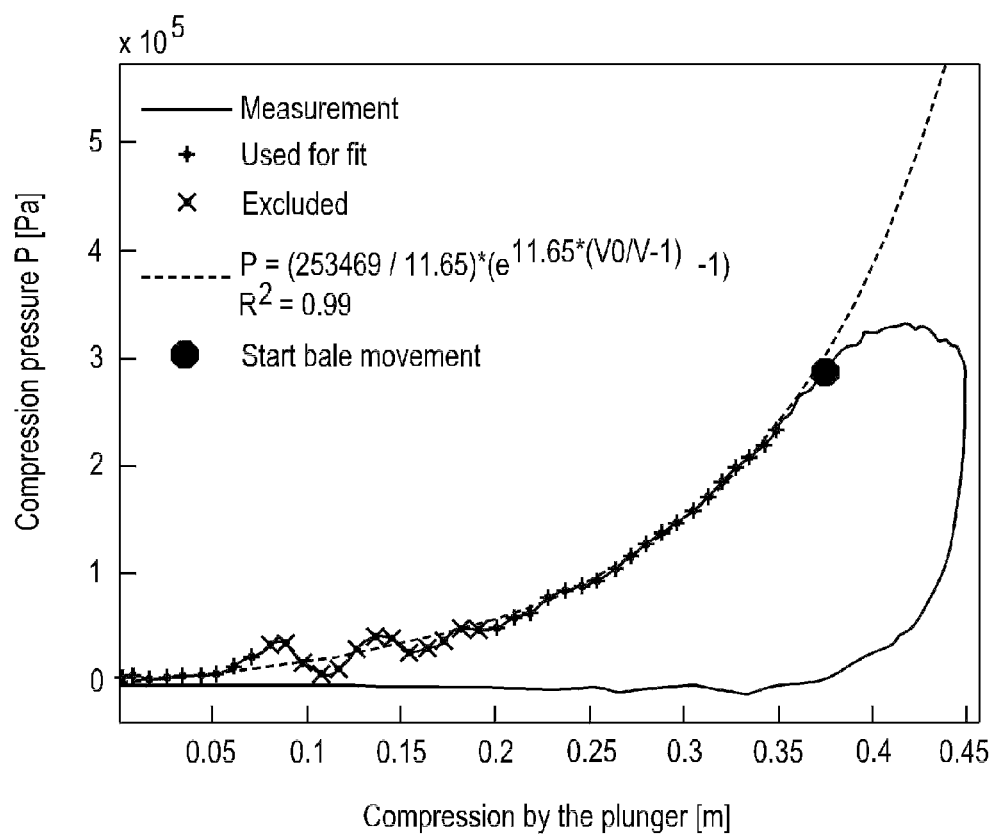
FIG. 13 shows a measured compression profile in the baler of FIG. 1, with the fit of a Faborode compression model.

In every plunger cycle, the compression force characterizes the behavior of the crop in the chamber. This compression profile was therefore fitted with the Faborode crop model and the crop parameters allow the calculation of the compression in that cycle. The Young modulus was determined by the slope of the stress-strain relation. FIG. 13 shows a measured compression profile in a large square baler, with the fit of the Faborode crop model. These material parameters are used in fitting the deformation along the chamber length (Eq. (11)).

The deformation along the chamber length is measured with wheels penetrating the crop in the chamber. When the plunger compresses the material, the measured rotation relates to the deformation of the material. In total, 12 length wheels are installed along the chamber length. It is obvious that more or less length wheels may be installed, depending on the total length of the bale chamber. FIG. 7 shows the length wheels in the bottom of the compression chamber for measuring the deformation profile. Due to errors on the measurements, the models are only fitted onto measurements which are averaged over several plunger cycles.

During compression by the plunger, more and more material will be deformed. At a certain plunger force, the continued movement of the plunger will move the bale instead of deforming more material. Hence, the measured deformation profile will decrease along the chamber length and will reach zero at a certain position in the chamber. For a proper fit of the compression, only the length wheels that measure a (positive) deformation are considered and the remaining, part of the bale is left out. Because the fitted profile considers several plunger cycles, the standard deviation on this profile determines the position in the chamber at which the measured deformation becomes zero. Therefore, the wheels where the medians minus 1 standard deviation are strictly positive, are used for fitting the compression models. The point of zero deformations indicates the length of the compression zone in the compression chamber. After this compression zone, there is a clamping zone which determines the clamping force in the chamber. In other words, the crop in this zone forms a wall against which the plunger can compress newly added and expanded crop. In this zone, the density does not change significantly.

At the exit of the compression chamber, the material expands outwards. This expansion can be modelled by assuming the force balances as given in Equations (1-3) but then the material model should be altered for modelling expansion. An example model for the expansion originates from the Faborode model and is given below:

$$\sigma = \left(\sigma_{max} - \frac{K_0}{b_c}\right)\left(e^{b_c\left(\frac{\rho}{\rho_0}-1\right)} - 1\right) + \frac{K_0}{b_c}$$

The compression and expansion zone both determine the final bale density. The hold zone determines the clamping force and thus the plunger force at which the deformation of more material stops and the bale starts to move.

Fitting the Compression Profile

The measured compression profiles were then fitted with Eqs. (6) and (11). The fitting algorithm minimizes the sum of the squared errors between the model and the measured data by means of the interior-point method.

The linear elastic material model (Eq. (6)) requires the Young modulus E, the Poisson coefficient ν, the friction coefficient μ and an initial condition for solving the differential equation $\epsilon_0$. Analogue to this, the non-linear material description requires the porosity index $b_c$, the force ratio the friction coefficient μ and the initial condition $u_0/u(x=0)$. The porosity index be and the Young modulus E are derived from the fit of the force profile. Hence, only the Poisson coefficient, force ratio and friction coefficient needed to be estimated by the model. Due to the sensitivity of the fit to the initial deformation and the inaccuracy of measuring it, the initial conditions were also determined by the fit, resulting in 3 fitting parameters per model.

Figure 14:
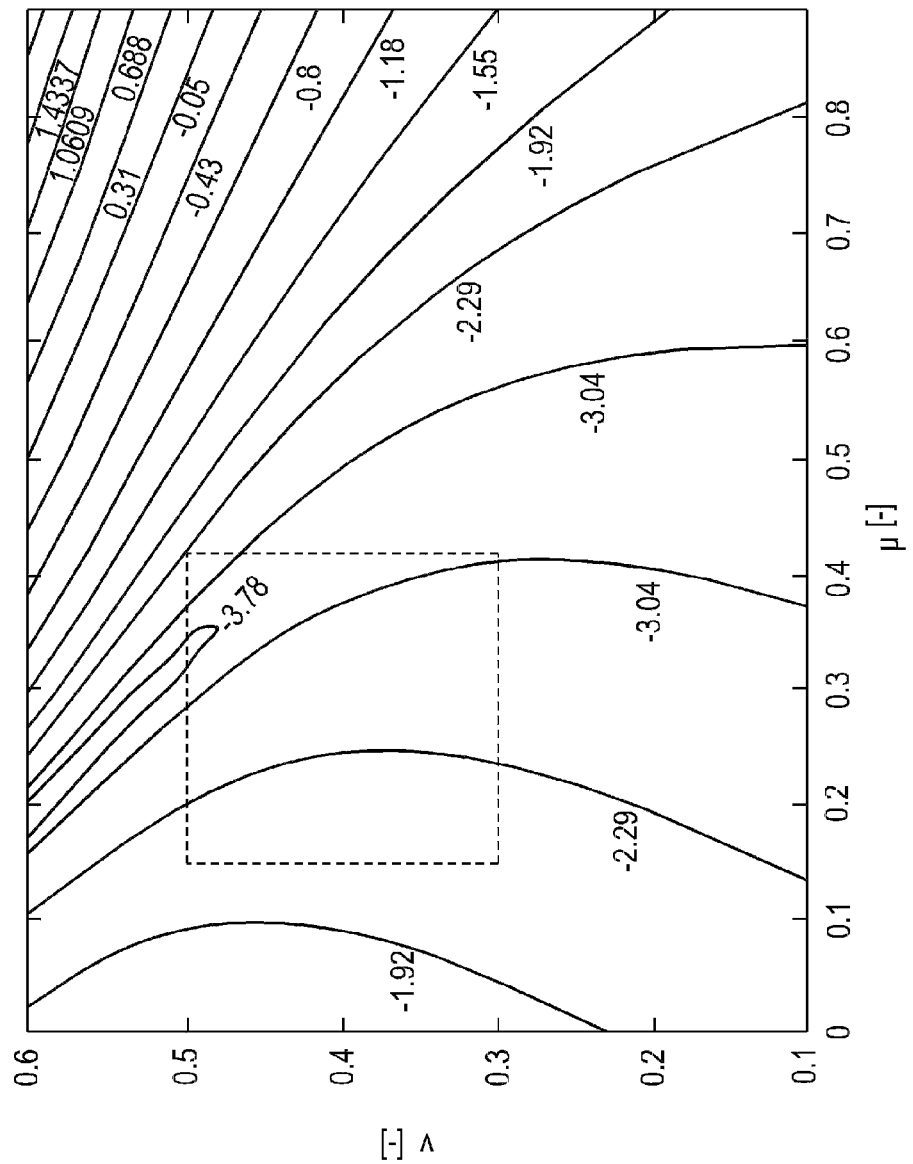
FIG. 14 shows the logarithm of the cost function at the estimated initial condition of the linear elastic compression model, with the rectangle indicating the expected region of the parameters.
Figure 15:
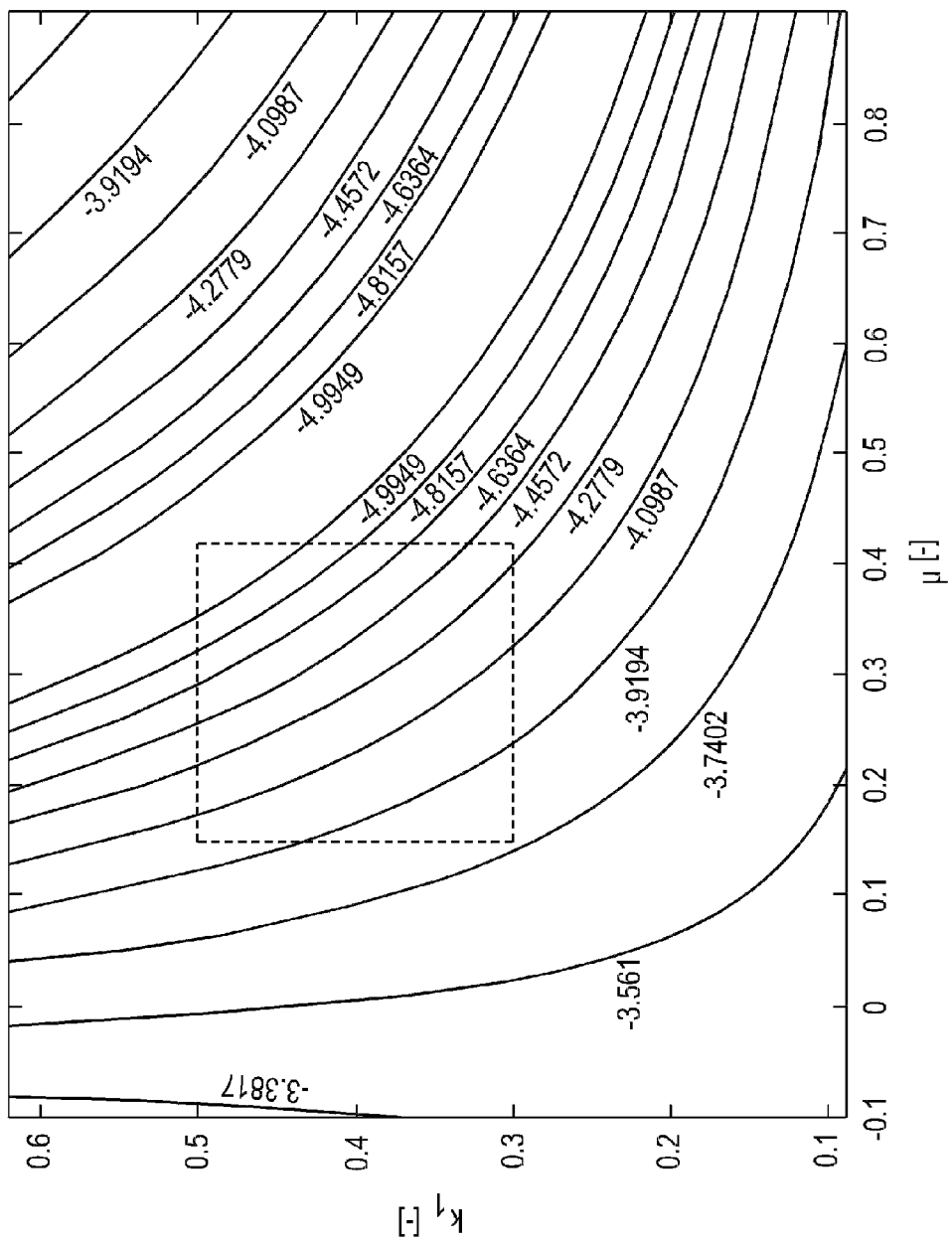
FIG. 15 shows the logarithm of the cost function at the estimated initial condition of the non-linear elastic compression model, with the rectangle indicating the expected region of the parameters.

The cost function of the models shows a large dependency between on one hand the Poisson coefficient ν and the friction coefficient μ, and on the other hand the force ratio $k_1$ and the friction coefficient μ. This dependency causes the optimization to find non-feasible parameter sets. The cost functions for the linear and non-linear material models are shown in FIGS. 14 and 15. FIG. 14 shows the logarithm of the cost function at the estimated initial condition for the linear elastic material model, and FIG. 15 shows the logarithm of the cost function at the estimated initial condition for the non-linear material model. The outlined box in these figure indicates the expected range of the parameters. It shows that the minimal value of the cost function always lies within this range, but more low values are found outside it.

Figure 16:
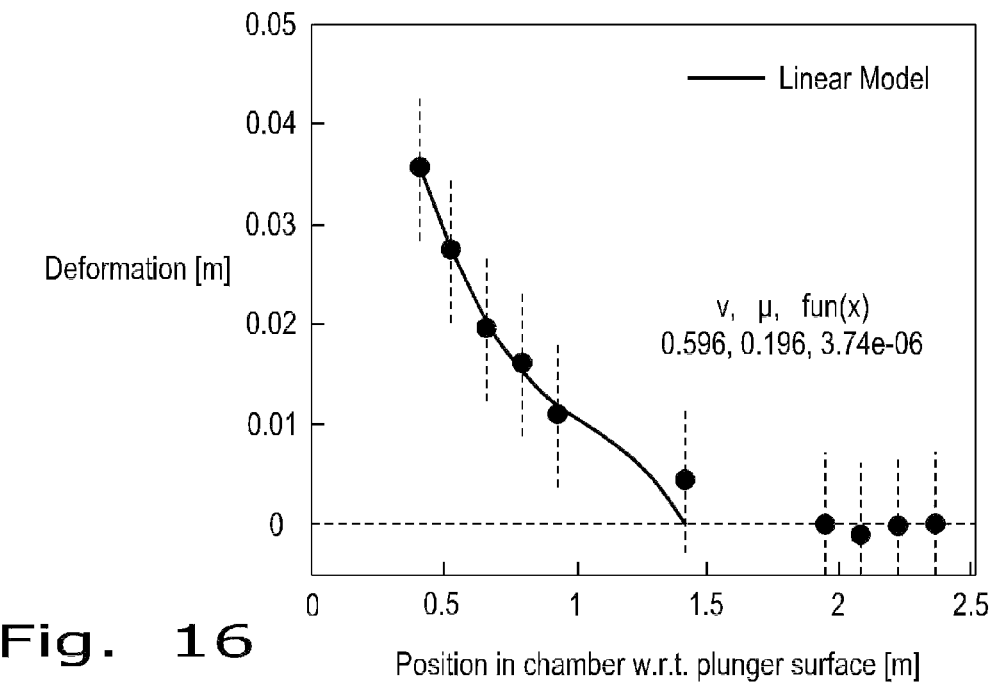
FIG. 16 illustrates a data fit for the deformation within the bale chamber with the linear elastic compression model.
Figure 17:
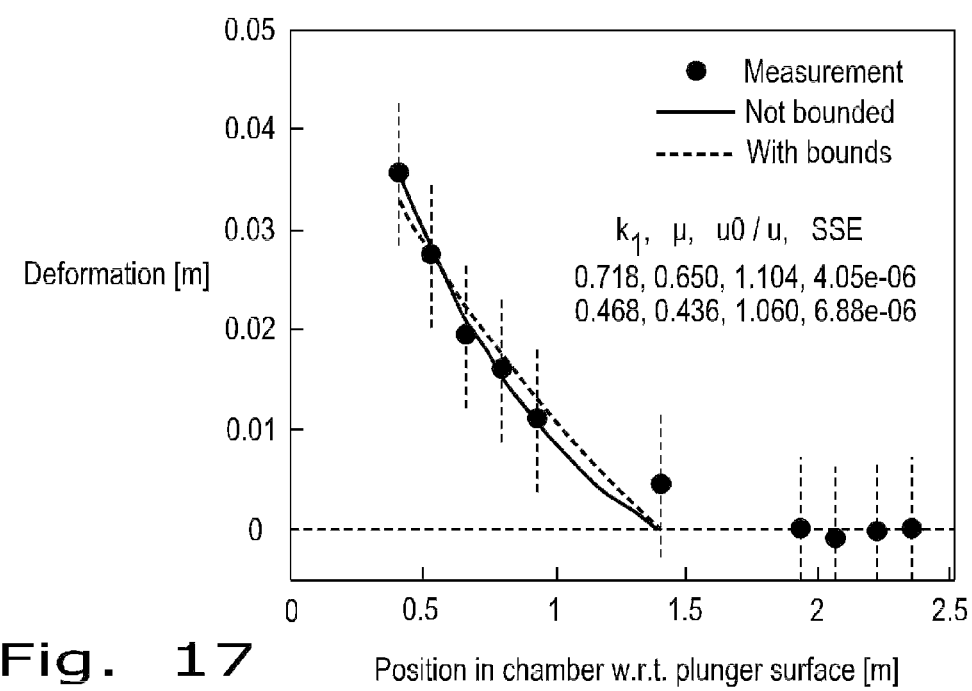
FIG. 17 illustrates a data fit for the deformation within the bale chamber with the non-linear elastic compression model.

Due to the parameter dependency, multiple initial guesses were used in the optimization. A proper spreading of the guesses inside the feasible parameter domain was obtained with a latin hypercube design. The resulting parameter set with the smallest evaluation of the cost function is then used as a solution of the optimization problem. The resulting fits of the linear and non-linear models are respectively shown in FIGS. 16 and 17. The figures show that the linear material model can capture the initial steep descent in the deformation but near 1.3 m, a flexure point occurs. This does not seem feasible and might be due to the initial condition which is set to 0 at the end of the fit. The models are fitted in two ways, one method bounds the parameters while the other does not. As shown in FIGS. 16 and 17, the resulting fits show the expected profile in the compression chamber. FIG. 16 shows a fit of the deformation in the compression chamber with the linear elastic material behaviour, and FIG. 17 shows a fit of the deformation in the compression chamber with the non-linear elastic material behaviour. The parameters can still differ from reality due to the unknown position of zero deformation. It can be concluded that the zero-crossing of the deformation profile is important in fitting the profile and research is needed in properly calculating this point.

From the foregoing, it is apparent that a linear approximation of the constitutive material behavior is only valid in a narrow pressure range and expanding this range requires adjusting the parameters during compression. Alternatively, the material can be modelled with a non-linear model. The more proper material description then allows for a simple approximation of the lateral forces, as shown with the force ratio $k_1$. However, this parameter shows a large dependency with the friction coefficient. Indeed, both k1 and μ are ratio's of forces relating two perpendicular stresses. The relation between these stresses is then given by the static momentum equations. As a consequence, many solutions with limited change in fitting performance exist.

The full design of the side walls is implemented and the effect of the bend can thus be investigated. The current models assume small inclinations which implies only a small bend can be implemented. Since a large bend would severely damage the bale shape and would make the compression too aggressive, the assumption of small angles can still hold.

Conclusions of Fitting the Compression Profile

The calculation of the deformation profile implies calculating the zone of compression in the compression chamber. The larger this zone, the more material will be deformed in the compression cycle, which means a limited clamping. The current detection of the point of zero compression is based on the measurements of the length wheels. Therefore, this detection is not accurate enough for proper model fitting.

Both linear and non-linear material models fit the deformation profile but only the non-linear model has a proper material description, resulting in feasible parameters. However, due to the dependency between k1 and μ in the non-linear model, multiple solutions exist. The current optimization is influenced from measurement error caused by the parameter estimation (of parameters E and bc) and the calculation of the point of zero deformation.

Up till now, only the compression is considered. However, when crop is compressed until a certain density and it is held for some time, the required compression force will decrease. The decrease of the compression force with time is called relaxation. Since a bale can stay up to 60 sec. in the compression chamber, this effect should not be neglected.

Relaxation Analysis Example

A simple description of the relaxation behavior is given by the Maxwell model (Equation 17). In this model, the relaxation time η*E−1 describes the time until the stress decays to e−1 (or approximately 36.8%) of its initial value (Sitkei, G., "Mechanics of Agricultural Materials", Elsevier, Amsterdam (1986)).

$$\sigma = -R\eta(e^{(-Et/\eta)} - 1) \tag{17}$$

A second relaxation model is given by Peleg (1980) as:

$$F0t = k1 + k2t$$

$$F0 - F(t) \tag{18}$$

where:
F0 is the force at the beginning of the relaxation,
t is the time, and
k1, and k2 are empirical parameters.

It is to be noted that k1−1 is the initial decay rate of the force F with time and k2−1 is the decay rate of the relative force (F0−F(t))*F0−1 close to the end of relaxation. The model of Peleg is used to define the asymptotic modulus Ea as (Peleg, 1980):

$$Ea = F0(1 - 1/k2)$$

$$A\epsilon \tag{19}$$

where A is the cross sectional area of the sample and $\epsilon$ is the applied relative deformation. The asymptotic modulus is a measure for the power of the material to resist the applied stress (Peleg, 1980). Both the relaxation time and the asymptotic modulus characterize the resistance of the crop to the applied deformation.

Figure 18:
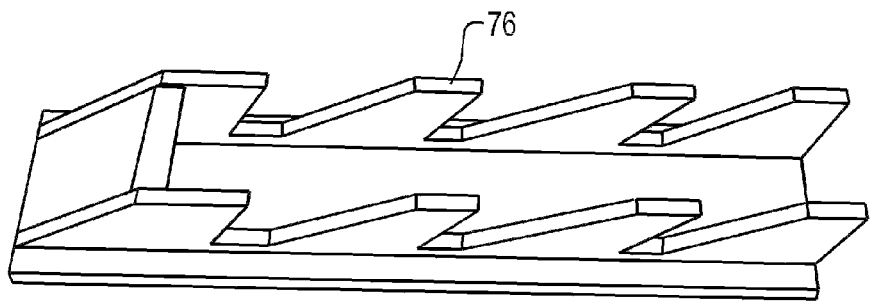
FIG. 18 is a perspective view of a hay dog which may be used to hold the crop material between compression strokes of the plunger.
Figure 19:
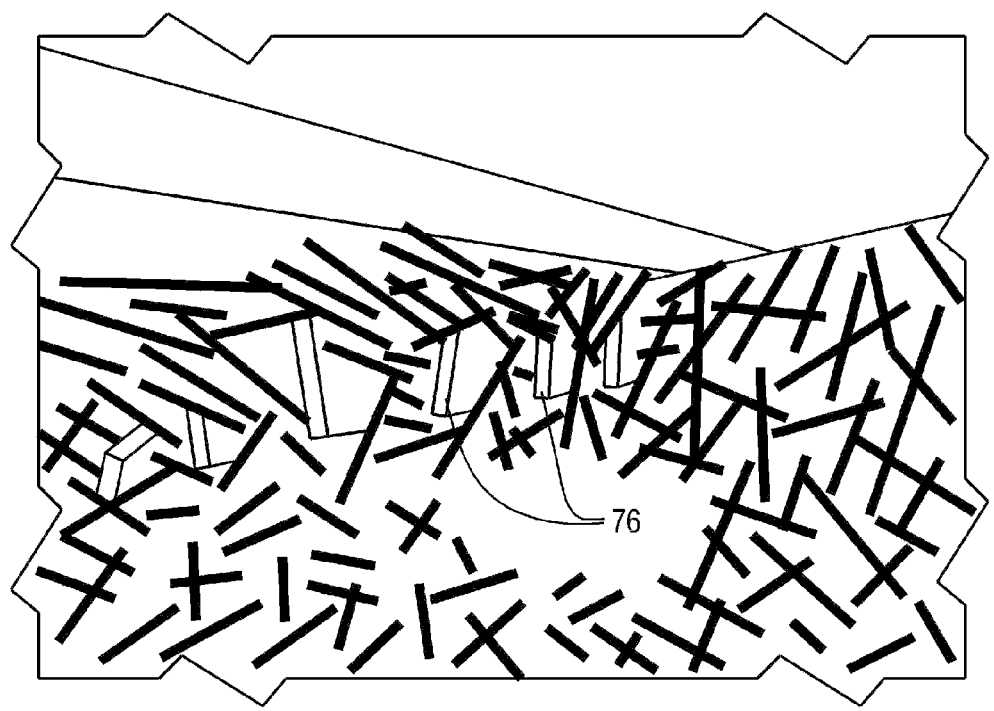
FIG. 19 is a perspective view of a number of hay dogs shown in FIG. 18 installed in the top door of a bale chamber.

Relaxation of the crop material can be lessened using structural features associated with the main bale chamber 26 which tend to hold and thereby inhibit relaxation of the crop material between strokes of the plunger 26. For example, the side doors 64 and/or top door 66 can be used to clamp and hold the crop material between strokes of plunger 26. As another example, so called "hay dogs" 76 can be used in a wall, e.g., top door, of the bale chamber 26 which hold the crop material between strokes of the plunger 26 (FIGS. 18 and 19). Such hay dogs 76 are further described in a copending patent application BE2012/0217 entitled "Friction Blocks for a Rectangular Baler", and in a copending patent application BE2012/0219 entitled "Movable Friction Blocks for a Rectangular Baler", each of which are incorporated herein by reference.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method of operating an agricultural baler, comprising the steps of:
   measuring with a sensor at least one physical input parameter associated with a compression profile of crop material in a bale chamber of the baler, wherein a plunger is configured for reciprocation within the bale chamber for compressing the crop material;
   analyzing the compression profile of the crop material with a controller, dependent upon the measured at least one physical input parameter; and
   adjusting at least one physical output parameter of the baler using a controller which affects the compression profile of the crop material in the bale chamber;
   wherein analyzing the compression profile comprises:
   performing a compression analysis and a relaxation analysis of the crop material within the bale chamber during bale formation.

2. The method of operating an agricultural baler of claim 1, wherein each said physical input parameter is directly associated with the bale chamber.

3. The method of operating an agricultural baler of claim 2, wherein each said physical input parameter comprises one of:
   a force on the plunger which reciprocates within the bale chamber;
   a position of the plunger within the main bale chamber;
   a position of at least one structural component defining the bale chamber; and
   a deformation of the crop material along a length of the bale chamber.

4. The method of operating an agricultural baler of claim 3, wherein said at least one physical input parameter includes the force on the plunger and the position of the plunger, which are correlated to each other.

5. The method of operating an agricultural baler of claim 4, wherein the position of the plunger is determined by measuring a rotation of a flywheel associated with the plunger, and a dead point associated with a change in direction of the plunger.

6. The method of operating an agricultural baler of claim 3, wherein said at least one structural component defining the bale chamber includes a pair of side doors and a top door.

7. The method of operating an agricultural baler of claim 3, wherein at least one length wheel located within the bale chamber is used to measure the deformation of the crop material along the length of the bale chamber.

8. The method of operating an agricultural baler of claim 7, wherein each length wheel is located in a floor of the bale chamber.

9. The method of operating an agricultural baler of claim 1, wherein each said physical output parameter is directly associated with the bale chamber.

10. The method of operating an agricultural baler of claim 9, wherein each said physical output parameter comprises one of:
    a position of one or more side walls associated with the bale chamber;
    a fixed length of the bale chamber; and
    a cross-sectional shape of the bale chamber.

11. The method of operating an agricultural baler of claim 1, including repeating the steps of measuring, analyzing and adjusting in a feedback loop to optimize performance of the baler.

12. The method of operating an agricultural baler of claim 11, wherein the optimization is carried out with respect to energy consumption of the baler and the compression profile of the crop material.

13. A method of operating an agricultural baler, comprising the steps of:
    measuring with a sensor at least one physical input parameter associated with a compression profile of crop material in a bale chamber of the baler;
    analyzing the compression profile of the crop material with a controller, dependent upon the measured at least one physical input parameter; and
    adjusting the at least one physical output parameter of the baler using a controller which affects the compression profile of the crop material in the bale chamber;
    wherein the step of analyzing the compression profile includes:
    performing a compression analysis of the crop material that utilizes the mathematical expression:

$$\sigma_X = \frac{K_0}{b_c}\left(e^{b_c\left(\frac{\rho}{\rho_0}-1\right)} - 1\right)$$

where:
$\sigma_x$=uniaxial stress;
$K_0$=crop parameter identifying material behavior;
$b_c$=crop parameter identifying material behavior;
$\rho_0$=initial density; and
$\rho$=resulting density.

14. A method of operating an agricultural baler, comprising the steps of:
    measuring with a sensor at least one physical input parameter associated with a compression profile of crop material in a bale chamber of the baler;
    analyzing the compression profile of the crop material with a controller, dependent upon the measured at least one physical input parameter; and
    adjusting at least one physical output parameter of the baler using a controller which affects the compression profile of the crop material in the bale chamber;
    wherein the step of analyzing the compression profile includes:
    performing a relaxation analysis of the crop material that utilizes the mathematical expression:

$$\frac{F_0 t}{F_0 - F(t)} = k_1 + k_2 t$$

where:

$F_0$ is the force at the beginning of the relaxation;

t is time; and k1 and k2 are empirical parameters.

15. An agricultural baler control system for a baler having a pre chamber and a bale chamber having a plunger configured for reciprocation within the bale chamber for compressing crop material, comprising:

a sensor configured for measuring at least one physical input parameter associated with a compression profile of crop material in a bale chamber of the baler;

a controller connected to the sensor, the controller configured for analyzing the compression profile of the crop material in the bale chamber being compressed by the plunger of the baler during a baling cycle, dependent upon the measured at least one physical input parameter, wherein analyzing the compression profile comprises performing a mathematical compression and relaxation analysis of the crop material within the bale chamber; and wherein the controller is configured to adjust at least one physical output parameter of the baler which affects the compression profile of the crop material in the bale chamber.

* * * * *